United States Patent
Heath

(10) Patent No.: US 9,132,762 B1
(45) Date of Patent: Sep. 15, 2015

(54) LIVESTOCK TRAILER HAVING ARRANGEMENT WITH IMPROVED LIVESTOCK UNLOADING CHARACTERISTICS

(71) Applicant: Donald B. Heath, Kinston, NC (US)

(72) Inventor: Donald B. Heath, Kinston, NC (US)

(73) Assignee: Horse Trailer Experts, Inc., Kinston, NC (US)

( * ) Notice: Subject to any disclaimer, the term of this patent is extended or adjusted under 35 U.S.C. 154(b) by 162 days.

(21) Appl. No.: 13/903,960

(22) Filed: May 28, 2013

(51) Int. Cl.
*B60P 3/04* (2006.01)
*B60P 1/00* (2006.01)

(52) U.S. Cl.
CPC .... *B60P 1/00* (2013.01); *B60P 3/04* (2013.01)

(58) Field of Classification Search
CPC ......................................................... B60P 3/04
USPC .......................... 119/400, 413, 412, 414, 415
See application file for complete search history.

(56) References Cited

U.S. PATENT DOCUMENTS

| | | | | |
|---|---|---|---|---|
| 96,500 | A * | 11/1869 | Street | 119/412 |
| 329,716 | A * | 11/1885 | Chamberlin | 119/412 |
| 2,809,755 | A * | 10/1957 | Martorello | 211/85.11 |
| 5,887,928 | A * | 3/1999 | Fenske | 296/24.31 |
| 6,537,016 | B2 * | 3/2003 | Bonsall | 414/537 |
| 6,895,897 | B1 * | 5/2005 | Culp et al. | 119/412 |
| 6,913,432 | B2 * | 7/2005 | Bonsall | 414/537 |
| 7,028,638 | B2 * | 4/2006 | Bonsall | 119/400 |
| 7,628,436 | B1 * | 12/2009 | Cutler | 296/24.31 |
| 2009/0058106 | A1 * | 3/2009 | Bacon | 292/336.3 |

FOREIGN PATENT DOCUMENTS

| | | | | |
|---|---|---|---|---|
| DE | 3907016 A1 * | 9/1990 | | B60P 3/04 |
| DE | 19924353 A1 * | 1/2001 | | B60P 3/04 |
| EP | 1647445 A1 * | 4/2006 | | B60P 3/04 |
| FR | 2940938 A1 * | 7/2010 | | B60P 3/04 |

* cited by examiner

*Primary Examiner* — Son T Nguyen
(74) *Attorney, Agent, or Firm* — NK Patent Law, PLLC

(57) ABSTRACT

A livestock trailer arrangement is provided. The arrangement includes an enclosure defining a first sidewall and a spaced-apart second sidewall and a side opening defined on the first sidewall for allowing ingress of a livestock. A first divider has a first position in which the divider extends at an angle from the first sidewall to the second sidewall and a second position in which the divider is pivoted about the second sidewall to define a passageway for ingress of a livestock through the side opening. An accessory assembly is pivotable about a rearward portion of the first sidewall such that the accessory assembly may be pivoted outwardly of the enclosure. A second divider has a position in which the divider is pivoted about the first sidewall to define a passageway for egress of a livestock through a rearward portion of the enclosure.

14 Claims, 6 Drawing Sheets

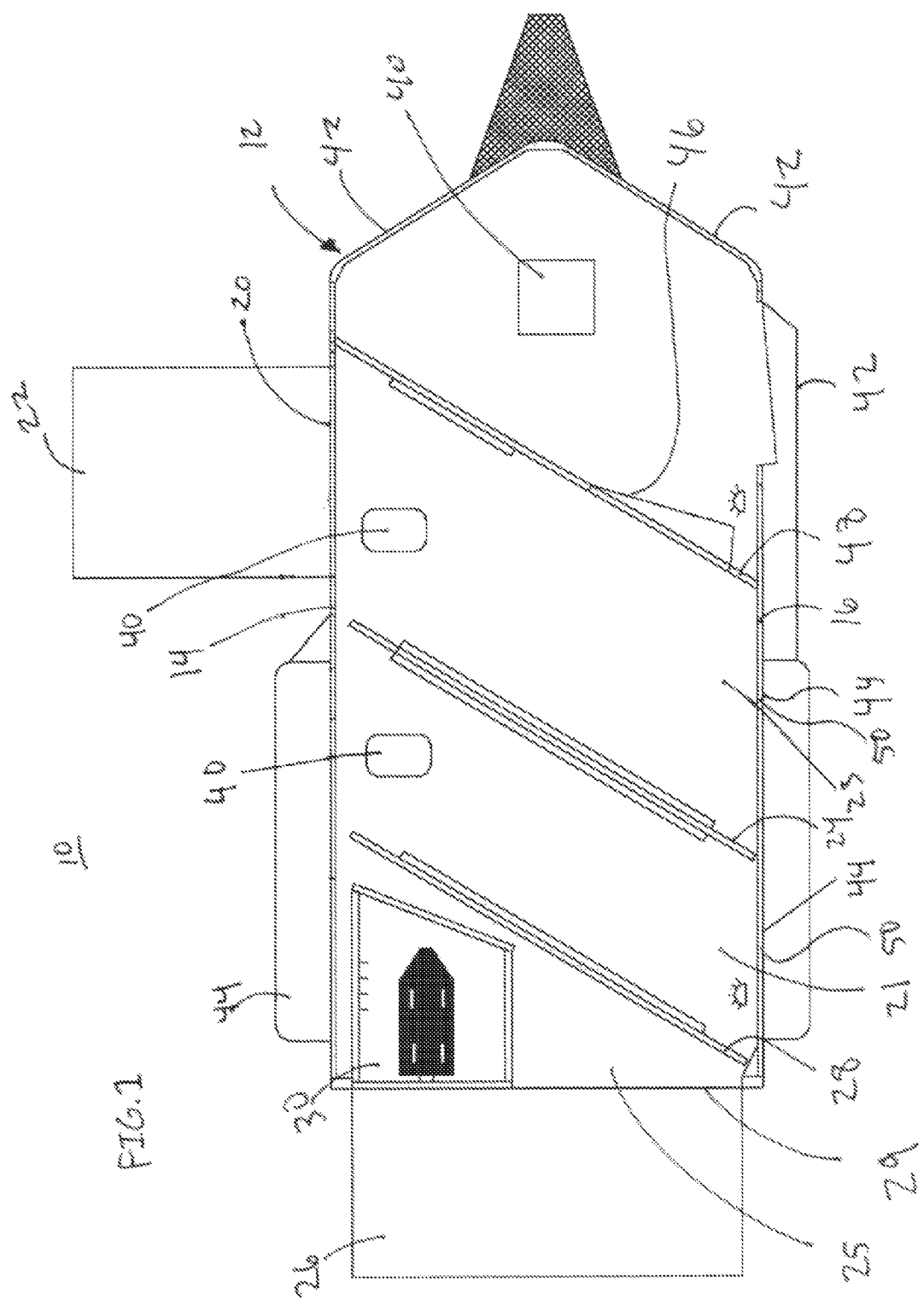

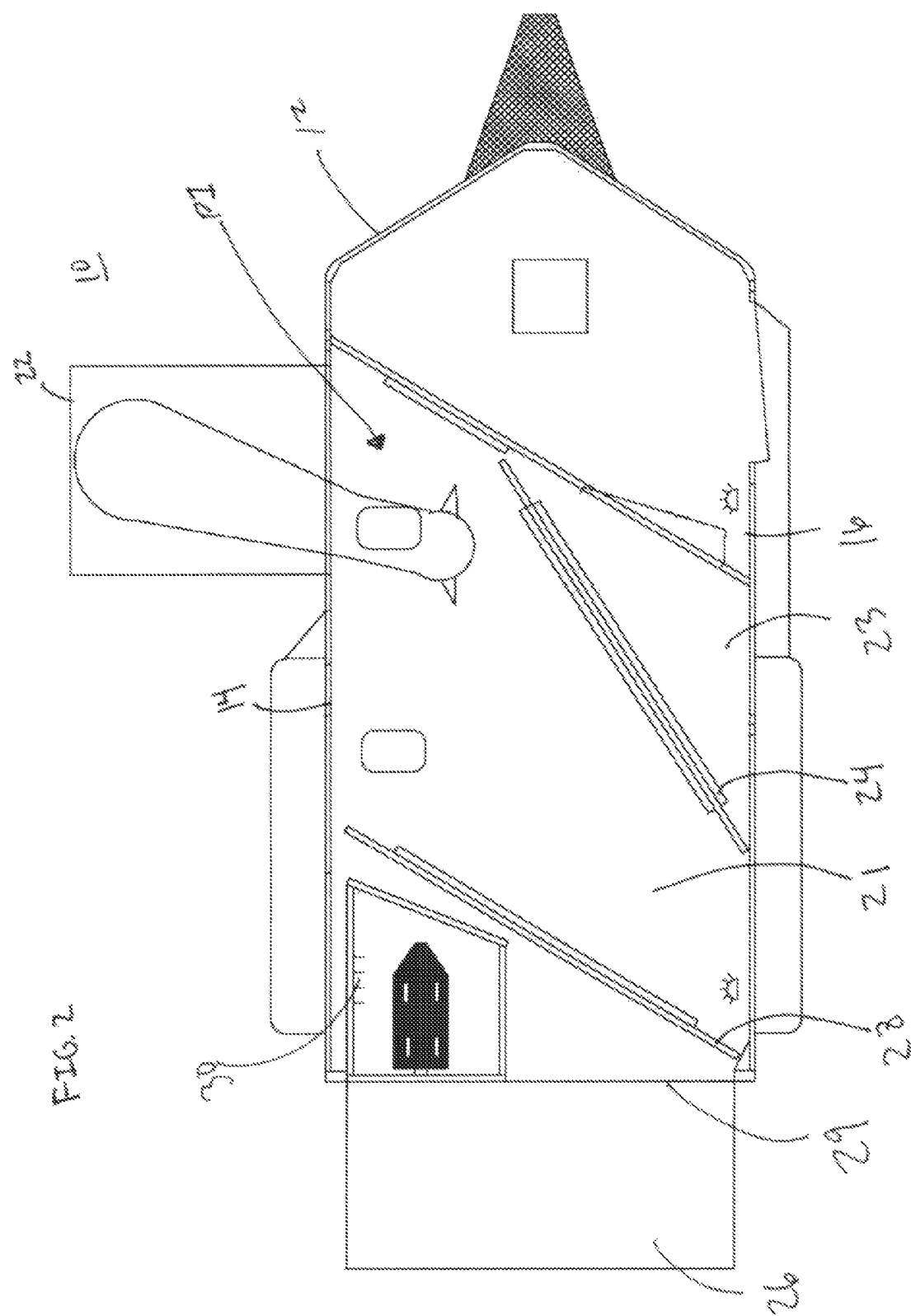

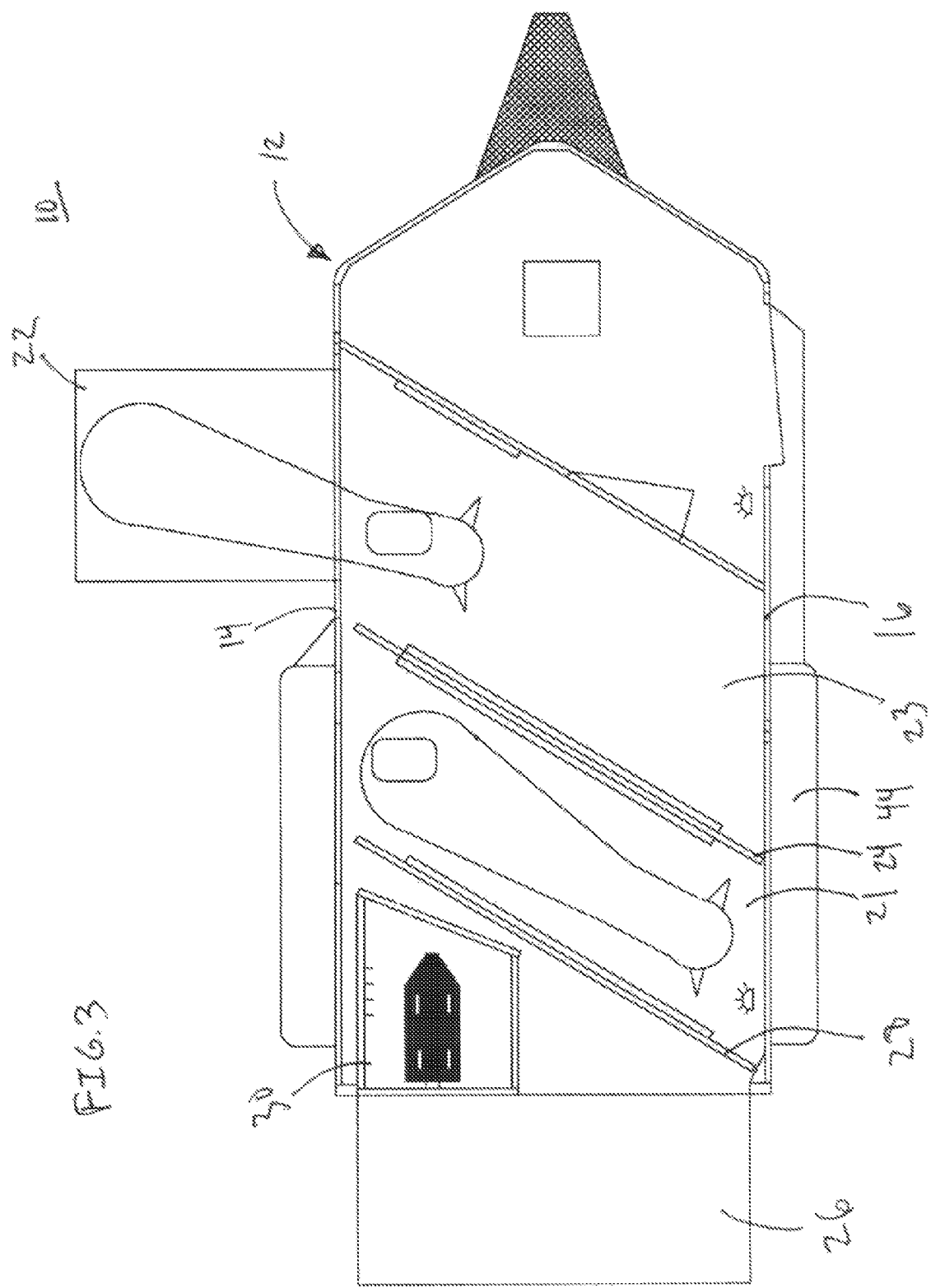

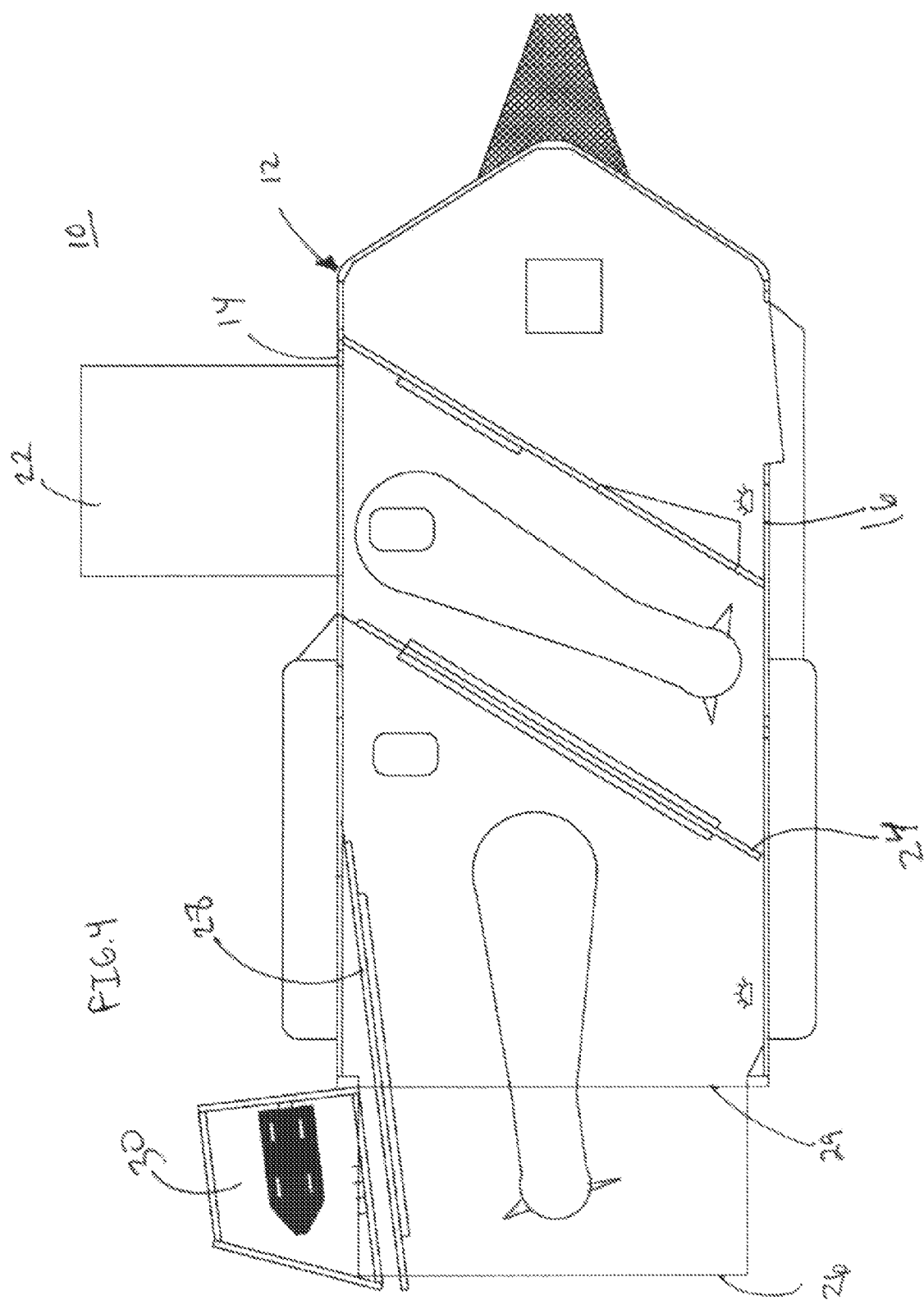

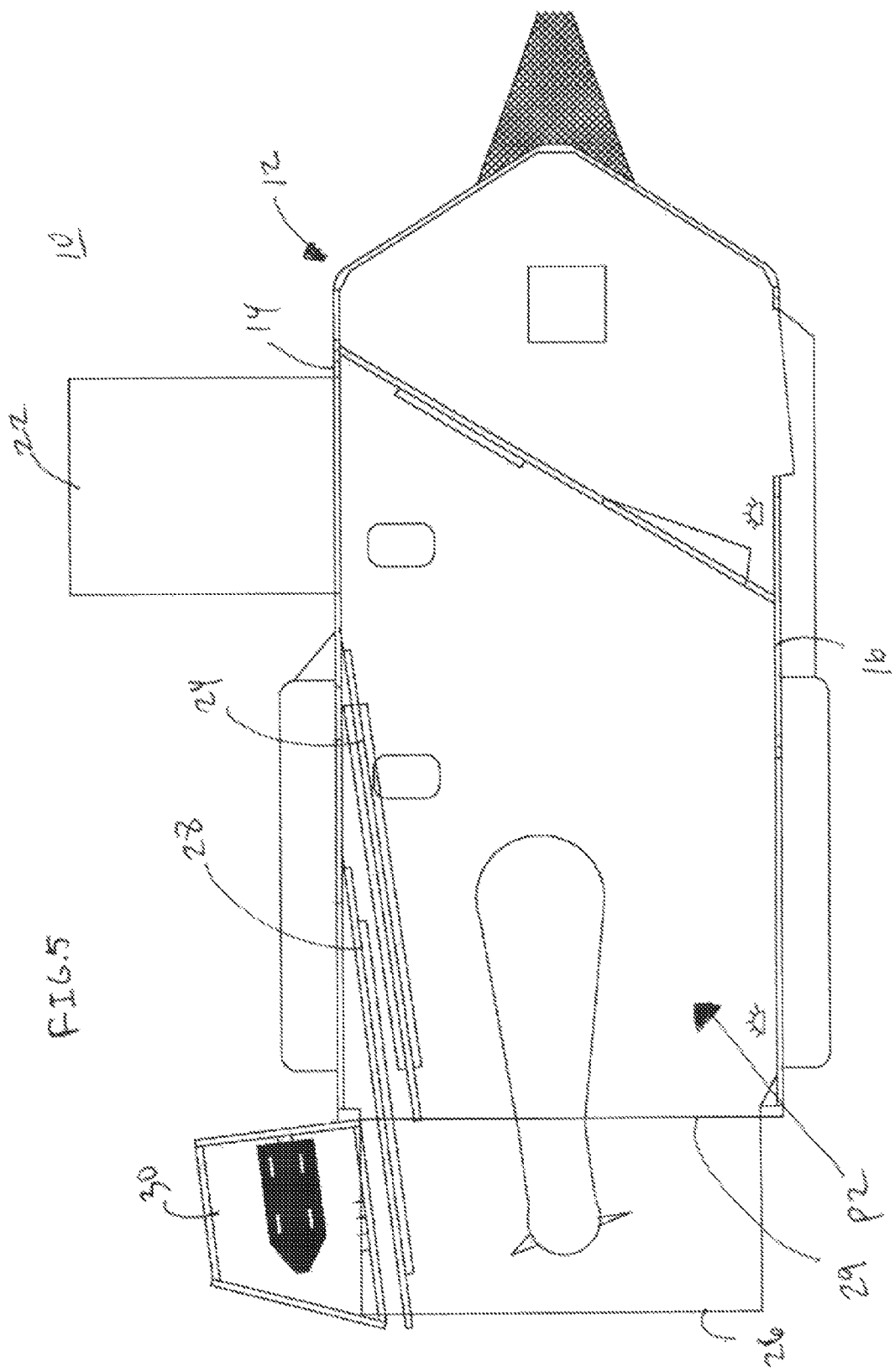

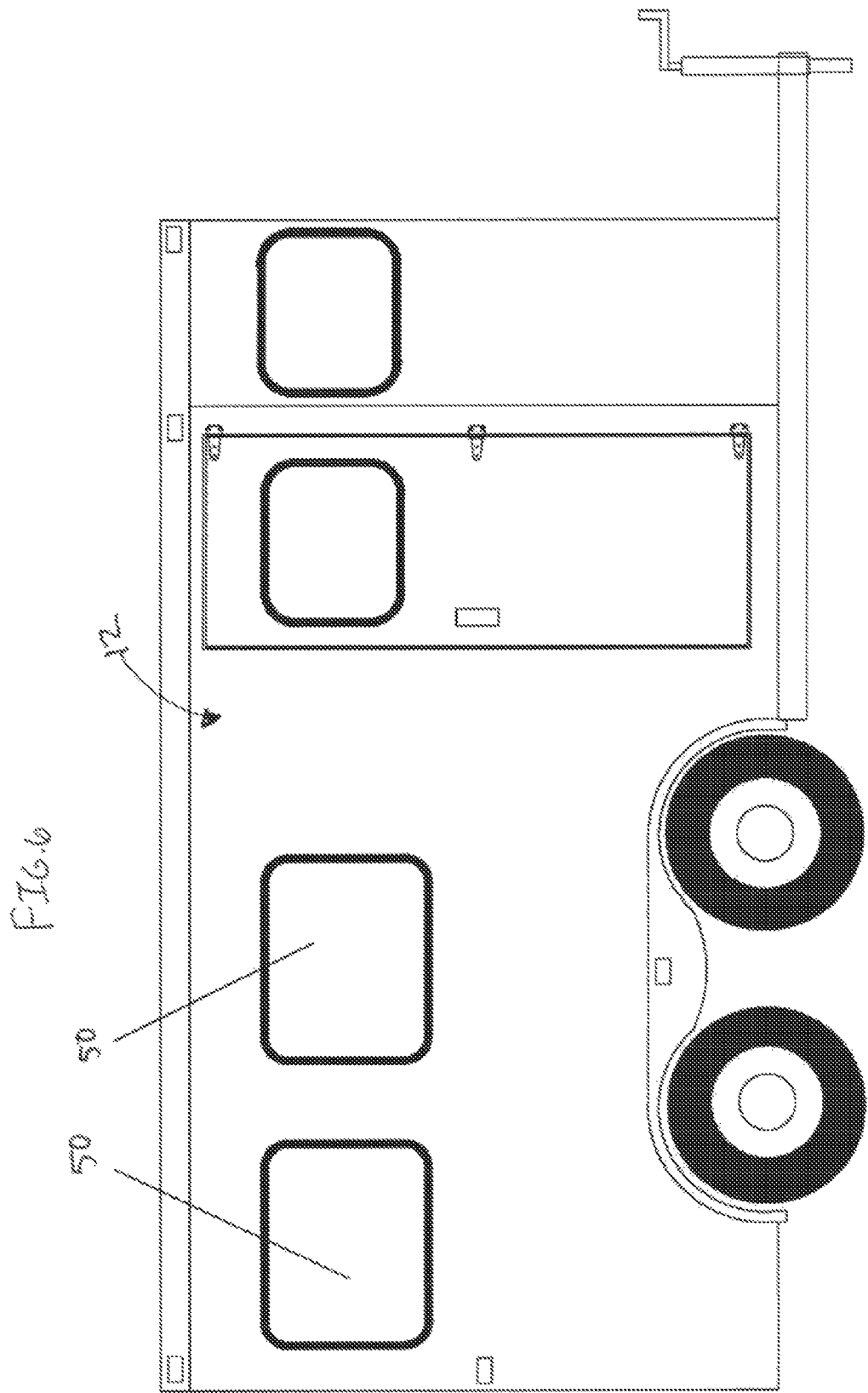

LIVESTOCK TRAILER HAVING ARRANGEMENT WITH IMPROVED LIVESTOCK UNLOADING CHARACTERISTICS

TECHNICAL FIELD

This disclosure is related to a livestock trailer having an arrangement that has improved livestock unloading characteristics. More particularly, this disclosure is directed towards a livestock trailer having a rearmost hinged divider and door assembly having an accessory aspect such as a tack storage area that provides for an enlarged unloading passageway for unloading livestock from the trailer.

BACKGROUND

Livestock trailers are used for transporting livestock from one location to another. For example, when transporting a horse, a livestock trailer may be used to transport a horse to a barn or other facility. Some livestock trailers have an open carrying area where the horses are placed and face frontwards in the trailer. Each respective horse is then haltered to a support within the trailer. This has the disadvantage of allowing the horses to comingle in the carrying area.

Still other trailers have divided stalls in the carrying area. In order to maximize carrying capacity, while minimizing trailer dimensions, a reverse slant stall system has been developed in which horses are held in stalls that are formed from dividers extending at an angle relative to the outer walls of the trailer and thus minimizing the trailer width required. Portable divider walls may be placed between adjacent horses in order to form a stall for each respective horse. In this arrangement, there is typically a tack storage area in the rearmost portion of the trailer where saddles, bridles, and other tack are stored. This tack storage area reduces the amount of opening space for the rear doors and thereby limits the space in which the horse can exit the trailer.

A need therefore exists for a method or solution that addresses these disadvantages.

SUMMARY

This Summary is provided to introduce a selection of concepts in a simplified form that are further described below in the Detailed Description of Illustrative Embodiments. This Summary is not intended to identify key features or essential features of the claimed subject matter, nor is it intended to be used to limit the scope of the claimed subject matter.

Disclosed herein is a livestock trailer arrangement. The arrangement may include an enclosure defining a pair of opposing sidewalls, an opening defined on one of the walls for allowing ingress of a livestock, at least one divider extending between the opposing walls when in a first position, and a door assembly spanning a rear facing portion of adjacent ends of the opposing walls and carrying an accessory assembly thereabout.

According to one or more embodiments, the opening is a drop down door.

According to one or more embodiments, the at least one divider includes a plurality of dividers, with adjacent pairs forming a stall for enclosing a livestock.

According to one or more embodiments, the divider extends at an angle relative to the walls when in the first position.

According to one or more embodiments, each divider is hingedly connected to the walls and configured for pivoting into a second position.

According to one or more embodiments, the rearmost facing divider extends parallel to the wall in a livestock unloading position when the door assembly is opened.

According to one or more embodiments, the door assembly includes a pair of doors, the doors joining at a medial position of the door assembly.

According to one or more embodiments, the accessory is carried by one of the pair of doors.

According to one or more embodiments, the accessory is a tack containing accessory.

According to one or more embodiments, the opposing walls are defined along a longitudinal axis of the trailer.

According to one or more embodiments, a method for loading and unloading livestock into a trailer. The method includes, in a trailer having an enclosure that defines a first and a second opposing sidewall, an opening defined on the first sidewall, and a first divider extending between the first and second sidewalls when in a first position in which a first end of the divider is rearward of the opening, pivoting the first end towards a front of the trailer to define a passageway from the opening into the trailer for ingress of a livestock. The method further includes pivoting a door assembly carrying an accessory assembly about a rearwardmost position of the first sidewall outwardly of the enclosure. The method further includes rearwardly pivoting a second divider extending between the first and second sidewalls when in a first position about a pivot point defined at the first wall so as to define a passageway from the trailer through a rear opening for egress of the livestock.

According to one or more embodiments, a livestock trailer arrangement is provided. The arrangement includes an enclosure defining a first sidewall and a spaced-apart second sidewall and a side opening defined on the first sidewall for allowing ingress of a livestock. A first divider has a first position in which the divider extends at an angle from the first sidewall to the second sidewall and a second position in which the divider is pivoted about the second sidewall to define a passageway for ingress of a livestock through the side opening. A door assembly carries an accessory assembly thereabout and is pivoted about a rearward portion the first sidewall such that the door assembly may be pivoted outwardly of the enclosure. A second divider has a first position in which the divider extends at an angle from the first sidewall to the second sidewall and a second position in which the divider is pivoted about the first sidewall to define a passageway for egress of a livestock through a rearward opening of the enclosure.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, the presently disclosed invention is not limited to the specific methods and instrumentalities disclosed. In the drawings:

FIG. 1 illustrates a top schematic view of an arrangement for a livestock trailer in a first orientation according to one or more embodiments disclosed herein;

FIG. 2 illustrates a top schematic view of an arrangement for a livestock trailer in a second orientation according to one or more embodiments disclosed herein;

FIG. 3 illustrates a top schematic view of an arrangement for a livestock trailer in a third orientation according to one or more embodiments disclosed herein;

FIG. 4 illustrates a top schematic view of an arrangement for a livestock trailer in a fourth orientation according to one or more embodiments disclosed herein;

FIG. 5 illustrates a top schematic view of an arrangement for a livestock trailer in a fifth orientation according to one or more embodiments disclosed herein; and FIG. 6 illustrates a side view of a livestock trailer.

DETAILED DESCRIPTION

The presently disclosed invention is described with specificity to meet statutory requirements. However, the description itself is not intended to limit the scope of this patent. Rather, the inventors have contemplated that the claimed invention might also be embodied in other ways, to include different steps or elements similar to the ones described in this document, in conjunction with other present or future technologies.

FIGS. 1 through 5 illustrate an overhead schematic view of a livestock trailer arrangement generally designated 10. The trailer depicted may be used for transporting livestock or any other animal. In one or more embodiments, the trailer depicted may be used for transporting horses.

The arrangement 10 may include an enclosure that is generally designated 12. The enclosure is partially formed from a first sidewall 14 and a spaced-apart second sidewall 16. The use of the terms "first" and "second" is used herein for convenience purposes only and is not intended to limit the claimed invention. A side opening 20 may be defined on the first sidewall 14 for allowing ingress of a livestock. The opening 20 may be, for example, a drop door 22 or swing open door that provides access into the enclosure 12. In this manner, a livestock may be ingressed through the side opening 20. A first divider 24 may be provided. The first divider 24 may be any appropriately configured dimension and is provided to span or generally span between the first sidewall 14 and the second sidewall 16. The first divider 24 has a first position in which the divider 24 extends at an angle from the first sidewall 14 to the second sidewall 16 as illustrated in FIG. 1. In this manner, the divider 24 spans about the entire space between the first wall 14 and the second wall 16. Divider 24 is configured to pivot about the second wall 16 into a second position as illustrated in FIG. 2. In this manner, a first passageway P1 is formed for ingress of livestock through the side opening 20.

A door assembly carrying an accessory assembly 30 may be provided about a rearward portion of the first sidewall 14 such that the accessory assembly 30 may be pivoted outwardly of the enclosure 12 as illustrated in FIG. 4 and FIG. 5. The accessory assembly 30 may be, for example, a tack or other hardware carrying assembly. The accessory assembly 30 is configured to be received within portion 25 of enclosure 12 that is illustrated in FIG. 1.

A second divider 28 is provided. The second divider 28 may be pivoted from a first position as illustrated in FIG. 1 in which the divider 28 extends at an angle from the first sidewall 14 to the second sidewall 16 to a second position in which the divider 28 is pivoted about the first sidewall 14 when the accessory assembly 30 is also pivoted outwardly of the enclosure 12 as illustrated in FIG. 4 and FIG. 5. This arrangement defines a passageway P2 for egress of a livestock through a rearward opening 29 of the enclosure 12 formed by opening of the door assembly 26.

The arrangement illustrated in FIG. 1 defines stalls 21 and 23 between respective dividers 24 and 28 in which a livestock is placed. Vents 40 may be provided proximal each stall 21 and 23, and in a front portion of the trailer in which living quarters or the like may be placed. Windows 42 may also be provided. Fender wells 44 may be provided for covering tire assemblies. A front wall 48 may be provided, to which a door 46 may be defined in. Drop down windows 50 may be provided, with further reference to FIG. 6, about each end of stalls 21 and 23 at wall 16. This allows a person to open windows 50 to provide access to each livestock, including providing food or water to each livestock.

Advantageous operation of the trailer having the trailer arrangement 10 is illustrated sequentially in FIGS. 1 through 5. As illustrated in FIG. 1, each of divider 24 and 28 is shown in the first position. Dividers 24 and 28 are advantageously provided for being pivoted about either end as illustrated. Alternatively, divider 28 may pivot only at the end defined at wall 14. The door 22 is opened, allowing ingress into the enclosure. First divider 24 is pivoted from the first position about a pivot point defined on the second wall 16 to the second position as illustrated in FIG. 2. This advantageously provides an area of increased space in passageway P1 for, using the illustrated example, a horse to enter the enclosure 12 and proceed into stall 21 as illustrated in FIG. 2. The divider 24 is then returned to the first position as illustrated in FIG. 3 to form stalls 21 and 23. At this point, if desired, a second horse may be ingressed into stall 23. The door 22 is then closed, thereby securing each of the first and second horses into respective stalls 21 and 23.

As illustrated in FIG. 4, the accessory assembly 30 is pivoted rearwardly and outwardly of the enclosure 12. In this manner, because the accessory assembly 30 is pivotable substantially out of the way of the enclosure 12, divider 28 may also be pivoted further until the divider is in a generally parallel arrangement with first sidewall 14. This provides an increased width of passageway P2 than might otherwise be available, thus making unloading of horses from the trailer arrangement more advantageous. At this point, the first horse is egressed from the enclosure through the rearward opening 29. As illustrated in FIG. 5, divider 24 is also pivoted rearwardly about a pivot point defined about the first wall 14, thereby allowing egress of the second horse in a manner similar to that of the first horse.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. A livestock trailer comprising:
   an enclosure defining an interior space between a pair of opposing parallel sidewalls that extend longitudinally and that are laterally spaced from each other;
   a rear door assembly spanning rear ends of the sidewalls;
   an opening defined on one of the sidewalls walls for allowing ingress of a livestock;
   at least one divider extending between the sidewalls when in a first position, at which a space that is triangular from an overhead perspective is defined between the divider and a plane defined by the rear ends of the sidewalls; and
   a tack accessory storage assembly pivotably carried about a rearward portion of the trailer, the tack accessory storage assembly being trapezoidal from an overhead perspective and pivotable from a first position, at which the tack accessory storage assembly partially fills the triangular space to a second position, at which the tack accessory storage assembly is located outside the interior space of the enclosure longitudinally beyond the plane defined by the rear ends of the sidewalls.

2. The trailer according to claim 1, further comprising a drop down door that permits access to the interior space through the opening.

3. The trailer according to claim 1, wherein the at least one divider includes a plurality of dividers, with an adjacent pair of dividers forming a stall for enclosing a livestock.

4. The trailer according to claim 3, wherein a drop down window is defined on one of the sidewalls.

5. The trailer according to claim 1, wherein each of the at least one divider extends at an angle relative to the sidewalls when in the first position.

6. The trailer according to claim 1, wherein each of the at least one divider is hingedly connected to the sidewalls and configured for pivoting into a second position.

7. The trailer according to claim 6, wherein a rear most facing divider extends generally parallel to the sidewalls in a livestock unloading position when the tack accessory storage assembly is in its second position.

8. The trailer according to claim 1, wherein the tack accessory storage assembly contains a bridle or a saddle related accessory.

9. A livestock trailer comprising:
an enclosure defining an interior space between a first sidewall and a parallel spaced-apart second sidewall, the first and second sidewalls extending longitudinally and having rearward ends that define a planar margin of the interior space;
a rear door assembly spanning rearward ends of the sidewalls;
a side opening defined on the first sidewall for allowing ingress of a livestock;
a first divider having a first position in which the first divider extends at an angle from the first sidewall to the second sidewall and a second position in which the first divider is pivoted about the second sidewall to define a passageway for ingress of a livestock through the side opening;
a second divider having a first position in which the second divider extends at an angle from the first sidewall to the second sidewall such that a space that is triangular from an overhead perspective is defined between the second divider and the planar margin, and a second position in which the second divider is pivoted about the first sidewall to define a passageway for egress of a livestock through the enclosure; and
a tack accessory storage assembly pivotally attached to the rearward end of the first sidewall, the tack accessory storage assembly being trapezoidal from an overhead perspective and pivotable from a first position, at which the tack accessory storage assembly partially fills the triangular space to a second position, at which the tack accessory storage assembly is located outside the interior space of the enclosure longitudinally beyond the planar margin.

10. The trailer according to claim 9, wherein the rear door assembly comprises a rearward drop down door.

11. The trailer according to claim 9, wherein each divider is hingedly connected to the sidewalls and configured for pivoting.

12. The trailer according to claim 9, wherein the second divider extends generally parallel to the first wall in a livestock unloading position.

13. The trailer according to claim 9, wherein the tack accessory storage assembly contains a bridle or a saddle related accessory.

14. The trailer according to claim 9, wherein a drop down window is defined on the second sidewall.

* * * * *